US007225664B2

(12) United States Patent
Hutchinson et al.

(10) Patent No.: US 7,225,664 B2
(45) Date of Patent: Jun. 5, 2007

(54) SECONDARY CONTAINMENT LEAK PREVENTION AND DETECTION SYSTEM AND METHOD

(75) Inventors: Ray J. Hutchinson, Houma, LA (US); Donald D. Halla, Southington, CT (US); Richard G. Dolson, Collinsville, CT (US); Robert P. Hart, East Hampton, CT (US); Richard K. Lucas, Enfield, CT (US); Kent D. Reid, Canton, CT (US)

(73) Assignee: Gilbarco Inc., Greensboro, NC (US)

( * ) Notice: Subject to any disclaimer, the term of this patent is extended or adjusted under 35 U.S.C. 154(b) by 87 days.

(21) Appl. No.: 11/183,707

(22) Filed: Jul. 18, 2005

(65) Prior Publication Data

US 2005/0247111 A1 Nov. 10, 2005

Related U.S. Application Data

(60) Division of application No. 10/430,890, filed on May 6, 2003, now Pat. No. 7,051,576, which is a continuation-in-part of application No. 10/238,822, filed on Sep. 10, 2002.

(51) Int. Cl.
*G01M 3/04* (2006.01)

(52) U.S. Cl. .................................... 73/40.5 R; 73/49.1

(58) Field of Classification Search ............. 73/40.5 R, 73/49.1, 49.5; 340/605
See application file for complete search history.

(56) References Cited

U.S. PATENT DOCUMENTS

| | | | |
|---|---|---|---|
| 2,821,993 | A | 2/1958 | Pacey et al. |
| 2,941,147 | A | 6/1960 | Mckinlay, Jr. |
| 2,947,147 | A | 8/1960 | Johnson |
| 3,183,723 | A | 5/1965 | Deters |
| 3,848,765 | A | 11/1974 | Durkop |
| 3,995,472 | A | 12/1976 | Murray |

(Continued)

FOREIGN PATENT DOCUMENTS

| | | |
|---|---|---|
| DE | 1258678 | 1/1968 |

(Continued)

OTHER PUBLICATIONS

Website, "Red Jacket—Quantum," www.redjacket.com/quantum.htm, printed May 27, 2003.

(Continued)

*Primary Examiner*—Daniel S. Larkin
(74) *Attorney, Agent, or Firm*—Withrow & Terranova, PLLC

(57) ABSTRACT

A pump housing that contains a pump that draws fuel from an underground storage tank containing fuel to deliver to fuel dispensers in a service station environment. The pump is coupled to a double-walled fuel pipe that carries the fuel from the pump to the fuel dispensers. The double-walled fuel piping contains an inner annular space that carries the fuel and an outer annular space that captures any leaked fuel from the inner annular space. The outer annular space is maintained through the fuel piping from the pump to the fuel dispensers so that the outer annular space can be pressurized by a pump to determine if a leak exists in the outer annular space or so that fuel leaked from the inner annular space can be captured by a leak containment chamber in the pump housing.

27 Claims, 9 Drawing Sheets

U.S. PATENT DOCUMENTS

| | | | |
|---|---|---|---|
| 4,088,987 | A | 5/1978 | Resler et al. ............... 340/605 |
| 4,523,454 | A | 6/1985 | Sharp |
| 4,644,780 | A | 2/1987 | Jeter |
| 4,653,312 | A | 3/1987 | Sharp |
| 4,672,366 | A | 6/1987 | Butts |
| 4,676,093 | A | 6/1987 | Pugnale et al. |
| 4,708,015 | A | 11/1987 | Sharp |
| 4,723,441 | A | 2/1988 | Sweeney |
| 4,805,444 | A | 2/1989 | Webb |
| 4,863,710 | A | 9/1989 | Rule et al. |
| 4,971,477 | A | 11/1990 | Webb et al. |
| 5,018,864 | A | 5/1991 | Richert |
| 5,042,290 | A | 8/1991 | Geisinger |
| 5,072,623 | A | 12/1991 | Hendershot |
| 5,081,864 | A | 1/1992 | Zaim |
| 5,098,221 | A | 3/1992 | Osborne |
| 5,115,936 | A | 5/1992 | Bartlow |
| 5,117,677 | A | 6/1992 | Hendershot et al. |
| 5,135,324 | A | 8/1992 | Bravo |
| 5,158,207 | A | 10/1992 | Van Daele |
| 5,184,504 | A | 2/1993 | Spring |
| 5,263,794 | A | 11/1993 | Webb |
| 5,265,652 | A | 11/1993 | Brunella |
| 5,297,896 | A | 3/1994 | Webb |
| 5,301,721 | A | 4/1994 | Hartmann |
| 5,343,191 | A | 8/1994 | McAtamney |
| 5,398,976 | A | 3/1995 | Webb |
| 5,400,646 | A | 3/1995 | Kraus et al. ................. 73/49.2 |
| 5,408,420 | A | 4/1995 | Slocum et al. .............. 364/558 |
| 5,440,918 | A | 8/1995 | Oster |
| 5,527,130 | A | 6/1996 | Webb |
| 5,586,586 | A | 12/1996 | Fiech |
| 5,713,607 | A | 2/1998 | Webb |
| 5,722,699 | A | 3/1998 | Brancher |
| 5,746,454 | A | 5/1998 | Webb |
| 5,782,275 | A | 7/1998 | Hartsell, Jr. et al. |
| 5,831,149 | A | 11/1998 | Webb ...................... 73/40.5 R |
| 5,911,155 | A | 6/1999 | Webb |
| 5,927,762 | A | 7/1999 | Webb .................... 285/123.15 |
| 5,955,657 | A | 9/1999 | Bravo |
| 5,975,110 | A | 11/1999 | Sharp |
| 5,975,132 | A | 11/1999 | Gleeson |
| 6,029,505 | A | 2/2000 | Webb |
| 6,032,699 | A | 3/2000 | Cochran et al. |
| 6,067,527 | A | 5/2000 | Lovell et al. |
| 6,070,760 | A | 6/2000 | Kenney et al. |
| 6,116,815 | A | 9/2000 | Chen |
| 6,126,409 | A | 10/2000 | Young |
| 6,223,765 | B1 | 5/2001 | Small et al. |
| 6,489,894 | B2 | 12/2002 | Berg |
| 6,523,581 | B2 | 2/2003 | Pendleton et al. |
| 2002/0044060 | A1 | 4/2002 | Berg |
| 2004/0234338 | A1 | 11/2004 | Monroe et al. |

FOREIGN PATENT DOCUMENTS

| | | | |
|---|---|---|---|
| DE | 2900960 | | 7/1979 |
| EP | 0931761 | A1 | 7/1999 |
| EP | 1179505 | A1 | 2/2002 |
| JP | 2000274378 | A | 10/2000 |
| WO | WO 86/07446 | | 12/1986 |

OTHER PUBLICATIONS

Website, "Veeder-Root—Interstitial Steel Tanks," www.veeder-root.com/dynamic/index.cfm?pageID=175, printed May 27, 2003.

SECONDARY CONTAINMENT LEAK PREVENTION AND DETECTION SYSTEM AND METHOD

RELATED APPLICATIONS

This patent application is a divisional patent application of U.S. patent application Ser. No. 10/430,890 entitled "SECONDARY CONTAINMENT LEAK PREVENTION AND DETECTION SYSTEM AND METHOD," filed on May 6, 2003, now U.S. Pat. No. 7,051,576, which is a continuation-in-part patent application of U.S. patent application Ser. No. 10/238,822 entitled "SECONDARY CONTAINMENT SYSTEM AND METHOD," filed on Sep. 10, 2002.

FIELD OF THE INVENTION

The present invention relates to detection of a leak or breach in the secondary containment of fuel piping in a retail service station environment.

BACKGROUND OF THE INVENTION

In service station environments, fuel is delivered to fuel dispensers from underground storage tanks (UST), sometimes referred to as fuel storage tanks. USTs are large containers located beneath the ground that contain fuel. A separate UST is provided for each fuel type, such as low octane gasoline, high-octane gasoline, and diesel fuel. In order to deliver the fuel from the USTs to the fuel dispensers, a submersible turbine pump (STP) is provided that pumps the fuel out of the UST and delivers the fuel through a main fuel piping conduit that runs beneath the ground in the service station.

Due to regulatory requirements governing service stations, the main fuel piping conduit is usually required to be double-walled piping. Double-walled piping contains an inner annular space that carries the fuel. An outer annular space, also called an "interstitial space," surrounds the inner annular space so as to capture and contain any leaks that occur in the inner annular space, so that such leaks do not reach the ground. An example of double-walled fuel pipe is disclosed in U.S. Pat. No. 5,527,130, incorporated herein by reference in its entirety.

It is possible that the outer annular space of the double-walled fuel piping could fail thereby leaking fuel outside of the fuel piping if the inner annular space were to fail as well. Fuel sump sensors that detect leaks are located underneath the ground in the STP sump and the fuel dispenser sumps. These sensors detect any leaks that occur in the fuel piping at the location of the sensors. However, if a leak occurs in the double-walled fuel piping in between these sensors, it is possible that a leak in the double-walled fuel piping will go undetected since the leaked fuel will leak into the ground never reaching one of the fuel leak sensors. The STP will continue to operate as normal drawing fuel from the UST; however, the fuel may leak to the ground instead of being delivered to the fuel dispensers.

Therefore, there exists a need to be able to monitor the double-walled fuel piping to determine if there is a leak or breach in the outer wall. Detection of a leak or breach in the outer wall of the double-walled fuel piping can be used to generate an alarm or other measure so that preventive measures can be taken to correct the leak or breach in the outer wall of the double-walled piping before a leak in the inner piping can escape to the ground.

SUMMARY OF THE INVENTION

The present invention relates to a sensing unit and tank monitor that monitors the vacuum level in the outer annular space of a double-walled fuel piping to determine if a breach or leak exist in the outer wall of the fuel piping. If the outer annular space cannot maintain a pressure or vacuum level over a given amount of time after being pressurized, this is indicative that the outer wall of the fuel piping contains a breach or leak. If the inner conduit of the fuel piping were to incur a breach or leak such that fuel reaches the outer annular space of the fuel piping, this same fuel would also have the potential to reach the ground through the breach in the outer wall in the fuel piping.

A sensing unit is provided that is communicatively coupled to a tank monitor or other control system. The sensing unit contains a pressure sensor that is coupled to vacuum tubing. The vacuum tubing is coupled to the outer annular space of the fuel piping, and is also coupled to a submersible turbine pump (STP) so that the STP can be used as a vacuum source to generate a vacuum level in the vacuum tubing and the outer annular space. The sensing unit and/or tank monitor determines if there is a leak or breach in the outer annular space by generating a vacuum in the outer annular space using the STP. Subsequently, the outer annular space is monitored using a pressure sensor to determine if the vacuum level changes significantly to indicate a leak. The system checks for both catastrophic and precision leaks.

In one leak detection embodiment of the present invention, the STP provides a vacuum source to the vacuum tubing and the outer annular space of the fuel piping. The tank monitor receives the vacuum level of the outer annular space via the measurements from the pressure sensor and the sensing unit. After the vacuum level in the outer annular space reaches a defined initial threshold vacuum level, the STP is deactivated and isolated from the outer annular space. The vacuum level of the outer annular space is monitored. If the vacuum level decays to a catastrophic threshold vacuum level, the STP is activated to restore the vacuum level. If the STP cannot restore the vacuum level to the defined initial threshold vacuum level in a defined amount of time, a catastrophic leak detection alarm is generated and the STP is shut down.

If the vacuum level in the outer annular space is restored to the defined initial threshold vacuum level within a defined period of time, a precision leak detection test is performed. The sensing unit monitors the vacuum level in the outer annular space to determine if the vacuum level decays to a precision threshold vacuum level within a defined period of time, in which case a precision leak detection alarm is generated, and the STP may be shut down.

Once a catastrophic leak or precision leak detection alarm is generated, service personnel are typically dispatched to determine if a leak really exists, and if so, to take corrective measures. Tests are conducted to determine if the leak exists in the vacuum tubing, in the sensing unit or in the outer annular space.

The sensing unit also contains a liquid trap conduit. A liquid detection sensor is placed inside the liquid trap conduit, which may be located at the bottom of the liquid trap conduit, so that any liquid leaks captured in the outer annular space of the fuel piping are stored and detected. The sensing unit and tank monitor can detect liquid in the sensing unit at certain times or at all times. If a liquid leak is detected by the tank monitor, the tank monitor will shut down the STP if so programmed.

Functional tests may also be performed to determine if the vacuum leak detection and liquid leak detection systems of the present invention are functioning properly. For the functional vacuum leak detection test, a leak is introduced into the outer annular space of the fuel piping. A vacuum leak detection alarm not being generated by the sensing unit and/or the tank monitor is indicative that some component of the vacuum leak detection system is not working properly.

A functional liquid leak detection test can also be used to determine if the liquid detection system is operating properly. The liquid detection sensor is removed from the liquid trap conduit and submerged into a container of liquid, or a purposeful liquid leak is injected into the liquid trap conduit to determine if a liquid leak detection alarm is generated. A liquid leak detection alarm not being generated by the sensing unit and/or the tank monitor is indicative that there has been a failure or malfunction with the liquid detection system.

The tank monitor may be communicatively coupled to a site controller and/or remote system to communicate leak detection alarms and other information obtained by the sensing unit. The site controller may pass information from the tank monitor onward to a remote system, and the tank monitor may communicate such information directly to a remote system.

Those skilled in the art will appreciate the scope of the present invention and realize additional aspects thereof after reading the following detailed description of the invention in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

This patent application is a divisional patent application of U.S. patent application Ser. No. 10/430,890 entitled "Secondary Containment Leak Prevention and Detection System and Method," filed on May 6, 2003, now U.S. Pat. No. 7,051,576, which is a continuation-in-part patent application of U.S. patent application Ser. No. 10/238,822 entitled "Secondary Containment System and Method," filed on Sep. 10, 2002, which is incorporated herein by reference in this application in its entirety. U.S. patent application Ser. No. 10/390,346 entitled "Fuel Storage Tank Leak Prevention and Detection System and Method," filed on Mar. 17, 2003, now U.S. Pat. No. 6,834,534, and including the same inventors as included in the present application is related to the present application and is also incorporated herein by reference in its entirety.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
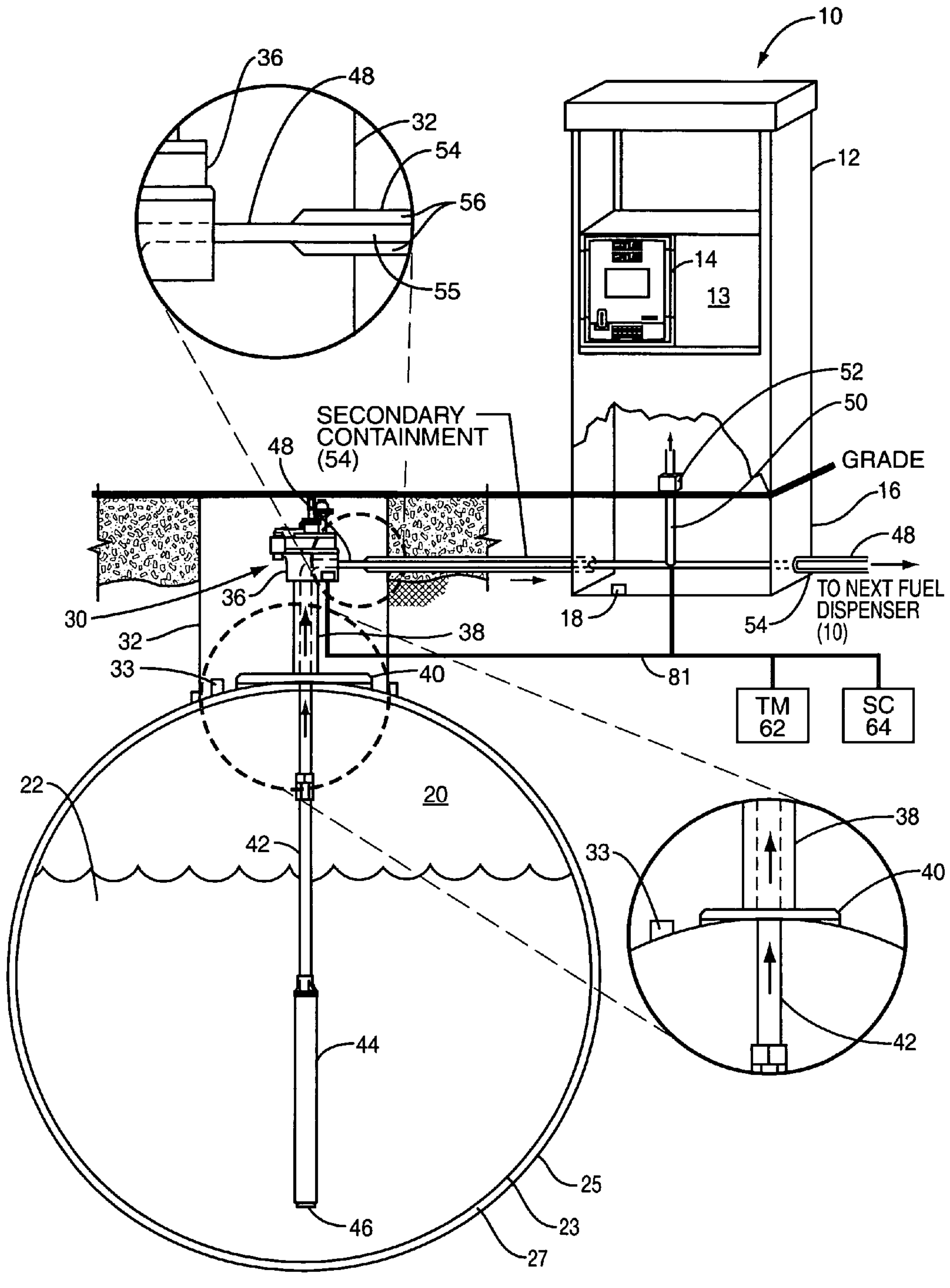
FIG. 1 PRIOR ART
FIG. 1 is an underground storage tank, submersible turbine pump and fuel dispenser system in a service station environment in the prior art.

FIG. 1 illustrates a fuel delivery system known in the prior art for a service station environment. A fuel dispenser 10 is provided that delivers fuel 22 from an underground storage tank (UST) 20 to a vehicle (not shown). The fuel dispenser 10 is comprised of a fuel dispenser housing 12 that typically contains a control system 13 and a display 14. The fuel dispenser 10 contains valves and meters (not shown) to allow fuel 22 to be received from underground piping and delivered through a hose and nozzle (not shown). More information on a typical fuel dispenser 10 can be found in U.S. Pat. No. 5,782,275, assigned to same assignee as the present invention, incorporated herein by reference in its entirety.

The fuel 22 that is dispensed by the fuel dispenser 10 is stored beneath the ground in the UST 20. There may be a plurality of USTs 20 in a service station environment if more than one type of fuel 22 is to be delivered by fuel dispensers 10 in the service station. For example, one UST 20 may contain a high octane of gasoline, another UST 20 may contain a low octane of gasoline, and yet another UST 20 may contain diesel. The UST 20 is typically a double-walled tank comprised of an inner vessel 23 that holds the fuel 22 surrounded by an outer casing 25. The outer encasing 25 provides an added measure of security to prevent leaked fuel 22 from reaching the ground. Any leaked fuel 22 from a leak in the inner vessel 23 will be captured in an annular space 27 that is formed between the inner vessel 23 and the outer casing 25. This annular space is also called an "interstitial space" 27. More information on USTs 20 in service station environments can be found in U.S. Pat. No. 6,116,815, which is incorporated herein by reference in its entirety.

A submersible turbine pump (STP) 30 is provided to draw the fuel 22 from the UST 20 and deliver the fuel 22 to the fuel dispensers 10. An example of a STP 30 is the Quantum™ manufactured and sold by the Marley Pump Company and disclosed at http://www.redjacket.com/guantum-.htm. Another example of a STP 30 is disclosed in U.S. Pat. No. 6,126,409, incorporated hereby by reference in its entirety. The STP 30 is comprised of a STP housing 36 that incorporates a vacuum pump and electronics (not shown). Typically, the vacuum pump is a venturi that is created using a portion of the pressurized fuel product, but the STP 30 is not limited to such an embodiment. The STP 30 is connected to a riser pipe 38 that is mounted using a mount 40 connected to the top of the UST 20. The riser pipe 38 extends down from the STP 30 and out of the STP housing 36. A fuel supply pipe (not shown) is coupled to the STP 30 and is located inside the riser pipe 38. The fuel supply pipe extends down into the UST 20 in the form of a boom 42 that is fluidly coupled to the fuel 22.

The boom 42 is coupled to a turbine housing 44 that contains a turbine, also called a "turbine pump" (not shown), both of which terms can be used interchangeably. The turbine pump is electrically coupled to the STP electronics in the STP 30. When one or more fuel dispensers 10 in the service station are activated to dispense fuel 22, the STP 30 electronics are activated to cause the turbine inside the turbine housing 44 to rotate to pump fuel 22 into the turbine housing inlet 46 and into the boom 42. The fuel 22 is drawn through the fuel supply pipe in the riser pipe 38 and delivered to the main fuel piping conduit 48. The main fuel piping conduit 48 is coupled to the fuel dispensers 10 in the service station whereby the fuel 22 is delivered to a vehicle (not shown). If the main fuel piping 54 is a double-walled piping, the main fuel piping 54 will have an interstitial space 56 as well to capture any leaked fuel.

Regulatory requirements require that any main fuel piping conduit 48 exposed to the ground be contained within a housing or other structure so that any leaked fuel 22 from the main fuel piping conduit 48 is captured. This secondary containment is provided in the form of a double-walled main conduit fuel piping 48, as illustrated in FIG. 1. The double-walled main conduit fuel piping 48 contains an inner annular space 55 surrounded by an outer annular space 56, also called the "interstitial space" 54. The fuel 22 is carried in the inner annular space 55. The terms "outer annular space" and "interstitial space" are well known interchangeable terms to one of ordinary skill in the art. In FIG. 1 and in prior art systems, the outer annular space 56 runs through the STP sump 32 wall and terminates to the inner annular space 55 once inside the STP sump 32 via clamping. This is because the STP sump 32 provides the secondary containment of the inner annular space 55 for the portion the main fuel piping conduit 48 inside the STP sump 32.

The STP 30 is typically placed inside a STP sump 32 so that any leaks that occur in the STP 30 are contained within the STP sump 32 and are not leaked to the ground. A sump liquid sensor 33 may also be provided inside the STP sump 32 to detect any such leaks so that the STP sump 32 can be periodically serviced to remove any leaked fuel. The sump liquid sensor 33 may be communicatively coupled to a tank monitor 62, site controller 64, or other control system via a communication line 81 so that liquid detected in the STP sump 38 can be communicated to an operator and/or an alarm be generated. An example of a tank monitor 62 is the TLS-350 manufactured by the Veeder-Root Company. An example of a site controller 64 is the G-Site® manufactured by Gilbarco Inc. Note that any type of monitoring device or other type of controller or control system can be used in place a tank monitor 62 or site controller 64.

The main fuel piping conduit 48, in the form of a double-walled pipe, is run underneath the ground in a horizontal manner to each of the fuel dispensers 10. Each fuel dispenser 10 is placed on top of a fuel dispenser sump 16 that is located beneath the ground underneath the fuel dispenser 10. The fuel dispenser sump 16 captures any leaked fuel 22 that drains from the fuel dispenser 10 and its internal components so that such fuel 22 is not leaked to the ground. The main fuel piping conduit 48 is run into the fuel dispenser sump 16, and a branch conduit 50 is coupled to the main fuel piping conduit 48 to deliver the fuel 22 into each individual fuel dispenser 10. The branch conduit 50 is typically run into a shear valve 52 located proximate to ground level so that any impact to the fuel dispenser 10 causes the shear valve 52 to engage, thereby shutting off the fuel dispenser 10 access to fuel 22 from the branch conduit 50. The main fuel piping conduit 48 exits the fuel dispenser sump 16 so that fuel 22 can be delivered to the next fuel dispenser 10, and so on until a final termination is made. A fuel dispenser sump sensor 18 is typically placed in the fuel dispenser sump 16 so that any leaked fuel from the fuel dispenser 10 or the main fuel piping conduit 48 and/or branch conduit 50 that is inside the fuel dispenser sump 16 can be detected and reported accordingly.

Figure 2:
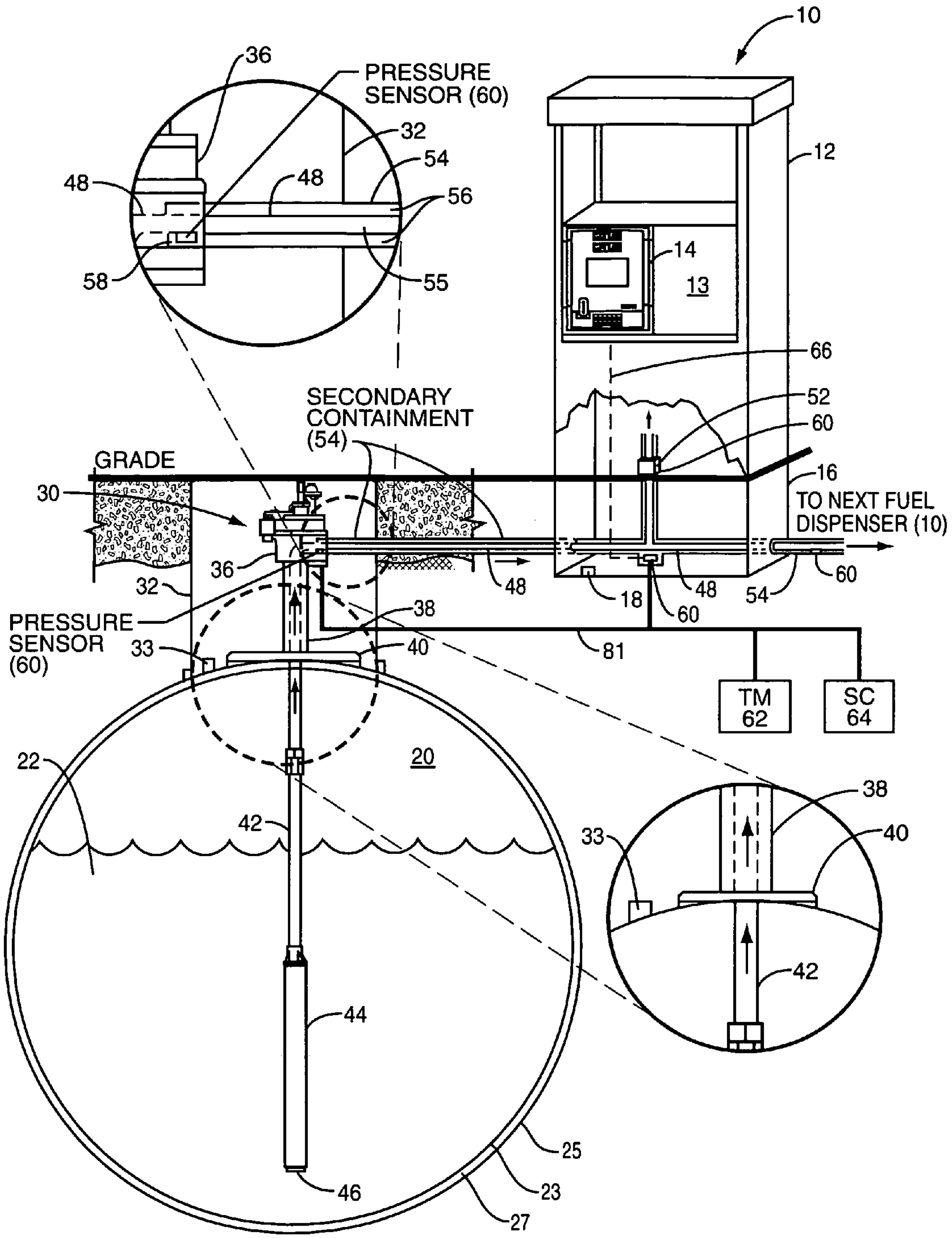
FIG. 2 is a schematic diagram of the outer annular space of the double-walled fuel piping extending into the submersible turbine pump sump and housing.

FIG. 2 illustrates a fuel delivery system in a service station environment according to one embodiment of the present invention. The secondary containment 54 provided by the outer annular space 56 of the main fuel piping conduit 48 is run through the STP sump 32 and into the STP housing 36, as illustrated. In this manner, the pressure or vacuum level created by the STP 30 can also be applied to the outer annular space 56 of the main fuel piping conduit 48 to detect leaks via monitoring of the vacuum level in the outer annular space 56, as will be discussed later in this patent application. The terms pressure and vacuum level are used interchangeably herein. One or more pressure sensors 60 may be placed in the outer annular space 56 in a variety of locations, including but not limited to inside the STP sump 32, the STP housing 36, and the outer annular space 56 inside the fuel dispenser sump 16.

In the embodiment illustrated in FIG. 2, the outer annular space 56 of the main fuel piping conduit 48 is run inside the STP housing 36 so that any leaked fuel into the outer annular space 56 can be detected by the sump liquid sensor 33 and/or be collected in the STP sump 32 for later evacuation. By running the outer annular space 56 of the main fuel piping conduit 48 inside the STP housing 36, it is possible to generate a vacuum level in the outer annular space 56 from the same STP 30 that draws fuel 22 from the UST 20 via the boom 42. Any method of accomplishing this function is contemplated by the present invention. One method may be to use a siphon system in the STP 30 to create a vacuum level in the outer annular space 56, such as the siphon system described in U.S. Pat. No. 6,223,765, assigned to Marley Pump Company and incorporated herein by reference its entirety. Another method is to direct some of the vacuum generated by the STP 30 from inside of the boom 42 to the outer annular space 56. The present invention is not limited to any particular method of the STP 30 generating a vacuum level in the outer annular space 56.

Figure 3:
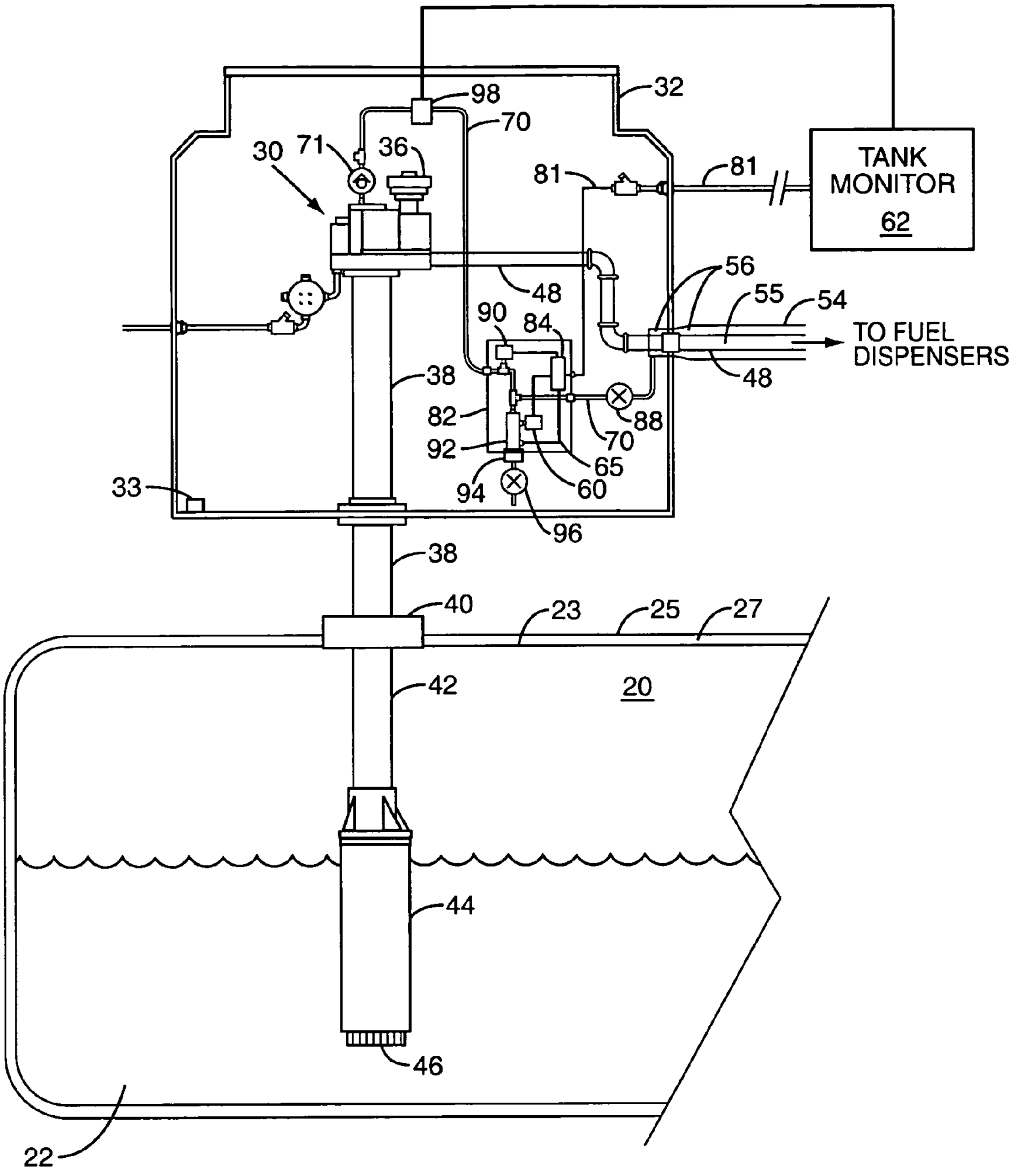
FIG. 3 is a schematic diagram of another embodiment of the present invention.

FIG. 3 illustrates another embodiment of running the outer annular space 56 of the main fuel piping conduit 48 only into the STP sump 32 rather than the outer annular space 56 being run with the inner annular space 55 into the STP housing 36. A vacuum tubing 70 connects the outer annular space 56 to the STP 30. Again, as discussed for FIG. 2 above, the STP 30 is coupled to the outer annular space 56, such as using direct coupling to the STP 30 (as illustrated in FIG. 2), or using a vacuum tubing 70 (as illustrated in FIG. 3) as a vacuum generating source to create a vacuum level in the outer annular space 56. Whether the configuration of coupling the STP 30 to the outer annular space 56 is accomplished by the embodiment illustrated in FIG. 2, FIG. 3, or other manner, the vacuum level monitoring and liquid leak detection aspects of the present invention described below and with respect to a sensing unit 82 illustrated in FIG. 3 is equally applicable to all embodiments.

FIG. 3 also illustrates a sensing unit 82 that may either provided inside or outside the STP sump 32 and/or STP housing 36 that monitors the vacuum level in the outer annular space 56 of the main fuel piping conduit 48. If the outer annular space 56 cannot maintain a vacuum level over a given period of time after being pressurized, this is indicative that the outer casing 25 contains a breach or leak. In this instance, if the inner vessel 23 were to incur a breach or leak such that fuel 22 reaches the outer annular space 56, this same fuel 22 would also have the potential to reach the ground through the breach in the outer casing 25. Therefore, it is desirable to know if the outer casing 25 contains a breach or leak when it occurs and before a leak or breach occurs in the inner vessel 23, if possible, so that appropriate notifications, alarms, and measures can be taken in a preventive manner rather than after a leak of fuel 22 to the ground occurs. It is this aspect of the present invention that is described below.

The sensing unit 82 is comprised of a sensing unit controller 84 that is communicatively coupled to the tank monitor 62 via a communication line 81. The communication line 81 is provided in an intrinsically safe enclosure inside the STP sump 32 since fuel 22 and or fuel vapor may be present inside the STP sump 32. The sensing unit controller 84 may be any type of microprocessor, microcontroller, or electronics that is capable of communicating with the tank monitor 62. The sensing unit controller 84 is also electrically coupled to a pressure sensor 60. The pressure sensor 60 is coupled to a vacuum tubing 70. The vacuum tubing 70 is coupled to the STP 30 so that the STP 30 can be used as a vacuum source to generate a vacuum level, which may be a positive or negative vacuum level, inside the vacuum tubing 70. The vacuum tubing 70 is also coupled to the outer annular space 56 of the main fuel piping conduit 48. A check valve 71 may be placed inline to the vacuum tubing 70 if it is desired to prevent the STP 30 from ingressing air to the outer annular space 56 of the main fuel piping conduit 48.

An isolation valve 88 may be placed inline the vacuum tubing 70 between the sensing unit 82 and the outer annular space 56 of the main fuel piping conduit 48 to isolate the sensing unit 82 from the outer annular space 56 for reasons discussed later in this application. A vacuum control valve 90 is also placed inline to the vacuum tubing 70 between the pressure sensor 60 and the STP 30. The vacuum control valve 90 is electrically coupled to the sensing unit controller 84 and is closed by the sensing unit controller 84 when it is desired to isolate the STP 30 from the outer annular space 56 during leak detection tests, as will be described in more detail below. The vacuum control valve 90 may be a solenoid-controlled valve or any other type of valve that can be controlled by sensing unit controller 84.

An optional differential pressure indicator 98 may also be placed in the vacuum tubing 70 between the STP 30 and sensing unit 82 on the STP 30 side of the vacuum control valve 90. The differential pressure indicator 98 may be communicatively coupled to the tank monitor 62. The differential pressure indicator 98 detects whether a sufficient vacuum level is generated in the vacuum tubing 70 by the STP 30. If the differential pressure indicator 98 detects that a sufficient vacuum level is not generated in the vacuum tubing 70 by the STP 30, and a leak detection test fails, this may be an indication that a leak has not really occurred in the outer annular space 56. The leak detection may have been a result of the STP 30 failing to generate a vacuum in the vacuum tubing 70 in some manner. The tank monitor 62 may use information from the differential pressure indicator 98 to discriminate between a true leak and a vacuum level problem with the STP 30 in an automated fashion. The tank monitor 62 may also generate an alarm if the differential pressure indicator 98 indicates that the STP 30 is not generating a sufficient vacuum level in the vacuum tubing 70. Further, the tank monitor 62 may first check information from the differential pressure indicator 98 after detecting a leak, but before generating an alarm, to determine if the leak detection is a result of a true leak or a problem with the vacuum level generation by the STP 30.

In the embodiments further described and illustrated herein, the differential pressure indicator 98 does not affect the tank monitor 62 generating a leak detection alarm. The differential pressure indicator 98 is used as a further information source when diagnosing a leak detection alarm generated by the tank monitor 62. However, the scope of the present invention encompasses use of the differential pressure indicator 98 as both an information source to be used after a leak detection alarm is generated and as part of a process to determine if a leak detection alarm should be generated.

The sensing unit 82 also contains a liquid trap conduit 92. The liquid trap conduit 92 is fluidly coupled to the outer annular space 56. The liquid detection trap 58 is nothing more than a conduit that can hold liquid and contains a liquid detection sensor 94 so that any liquid that leaks in the outer annular space 56 will be contained and cause the liquid detection sensor 94 to detect a liquid leak, which is then reported to the tank monitor 62. The liquid detection sensor 94 may contain a float (not shown) as is commonly known in one type of liquid detection sensor 94. An example of such a liquid detection sensor 94 that may be used in the present invention is the "Interstitial Sensor for Steel Tanks," sold by Veeder-Root Company and described in the accompanying document and http://www.veeder-root.com/dynamic/index-.cfm?paqeID=175, incorporated herein by reference in its entirety.

The liquid detection sensor 94 is communicatively coupled to the sensing unit controller 84 via a communication line 65. The sensing unit controller 84 can in turn generate an alarm and/or communicate the detection of liquid to the tank monitor 62 to generate an alarm and/or shut down the STP 30. The liquid detection sensor 94 can be located anywhere in the liquid trap conduit 92, but is preferably located at the bottom of the liquid trap conduit 92 at its lowest point so that any liquid in the liquid trap conduit 92 will be pulled towards the liquid detection sensor 94 by gravity. If liquid, such as leaked fuel 22, is present in the outer annular space 56, the liquid will be detected by the liquid detection sensor 94. The tank monitor 62 can detect liquid in the outer annular space 56 at certain times or at all times, as programmed.

If liquid leaks into the liquid trap conduit 92, it will be removed at a later time, typically after a liquid leak detection alarm has been generated, by service personnel using a suction device that is placed inside the liquid trap conduit 92 to remove the liquid. In an alternative embodiment, a drain valve 96 is placed inline between the liquid trap conduit 92 and the STP sump 32 that is opened and closed manually. During normal operation, the drain valve 96 is closed, and any liquid collected in the liquid trap conduit 92 rests at the bottom of the liquid trap conduit 92. If liquid is detected by the liquid detection sensor 94 and service personnel are dispatched to the scene, the service personnel can drain the trapped liquid by opening the drain valve 96, and the liquid will drain into the STP sump 32 for safe keeping and so that the system can again detect new leaks in the sensing unit 82. When it is desired to empty the STP sump 32, the service personnel can draw the liquid out of the STP sump 32 using a vacuum or pump device.

Now that the main components of the present invention have been described, the remainder of this application describes the functional operation of these components in order to perform leak detection tests in the outer annular space 56 of the main fuel piping conduit 48 and liquid detection in the sensing unit 82. The present invention is capable of performing two types of leak detections tests: precision and catastrophic. A catastrophic leak is defined as a major leak where a vacuum level in the outer annular space 56 changes very quickly due to a large leak in the outer annular space 56. A precision leak is defined as a leak where the vacuum level in the outer annular space 56 changes less drastically than a vacuum level change for a catastrophic leak.

Figure 4A:
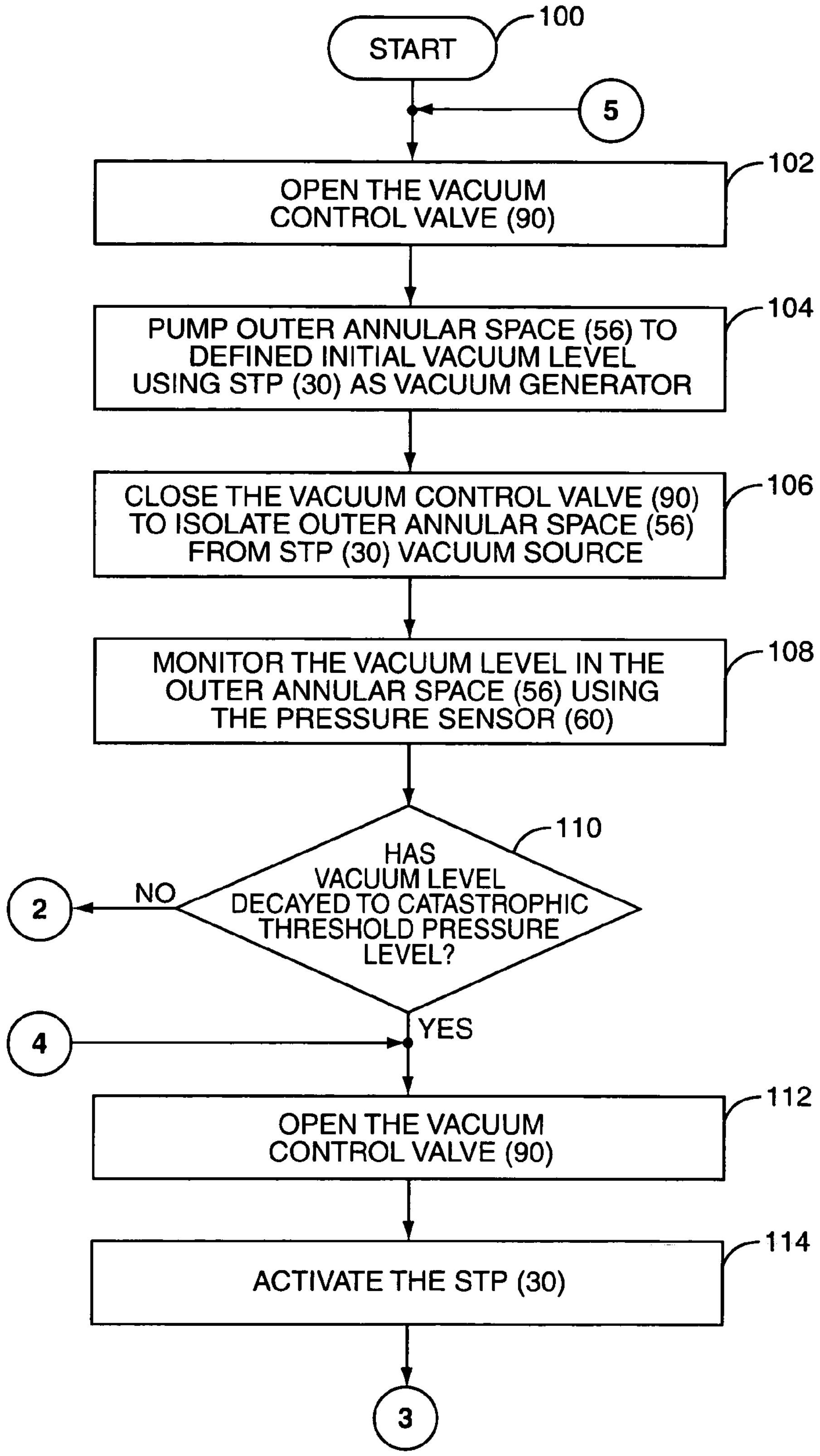
FIGS. 4A and 4B are flowchart diagrams illustrating one embodiment of the leak detection test of the present invention.
Figure 4B:
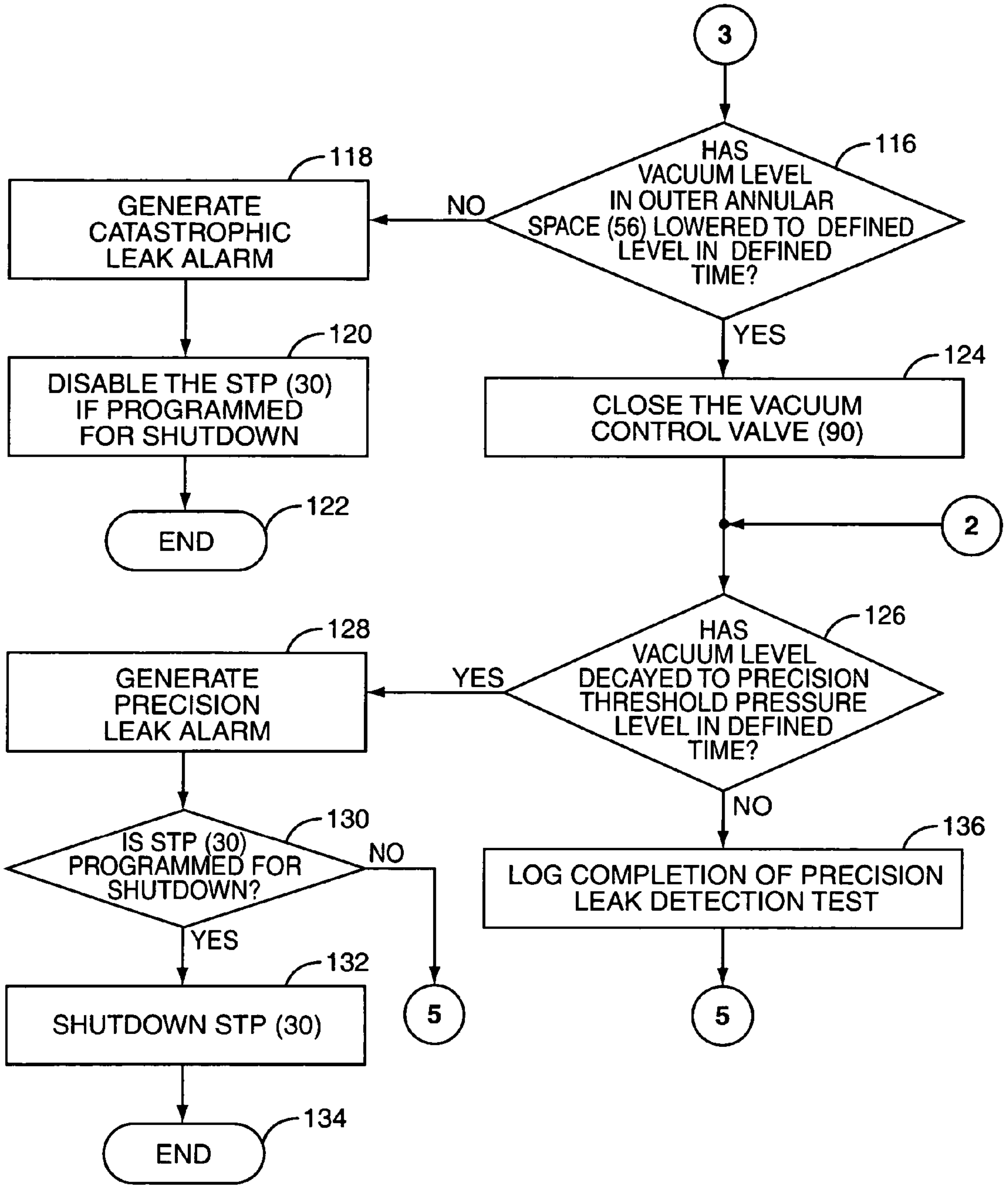

FIGS. 4A and 4B provide a flowchart illustration of the leak detection operation of the sensing unit according to one embodiment of the present invention that performs both the catastrophic and precision leak detection tests for the outer wall 54 of the main fuel piping conduit 48. The tank monitor 62 directs the sensing unit 82 to begin a leak detection test to start the process (step 100). Alternatively, a test may be started automatically if the vacuum level reaches a threshold. In response, the sensing unit controller 84 opens the vacuum control valve 90 (step 102) so that the STP 30 is coupled to the outer annular space 56 of the fuel piping 48 via the vacuum tubing 70. The STP 30 provides a vacuum source and pumps the air, gas, and/or liquid out of the vacuum tubing 70 and the outer annular space 56, via its coupling to the vacuum tubing 70, after receiving a test initiation signal from the tank monitor 62. The STP 30 pumps the air, gas or liquid out of the outer annular space 56 until a defined initial threshold vacuum level is reached or substantially reached (step 104). The tank monitor 62 receives the vacuum level of the outer annular space 56 via the measurements from the pressure sensor 60 communication to the sensing unit controller 84. This defined initial threshold vacuum level is −15 inches of Hg in one embodiment of the present invention, and may be a programmable vacuum level in the tank monitor 62. Also, note that if the vacuum level in the outer annular space 56 is already at the defined initial threshold vacuum level or substantially close to the defined initial vacuum threshold level sufficient to perform the leak detection test, steps 102 and 104 may be skipped.

After the vacuum level in the vacuum tubing 70 reaches the defined initial threshold vacuum level, as ascertained by monitoring of the pressure sensor 60, the tank monitor 62 directs the sensing unit controller 84 to deactivate the STP 30 (unless the STP 30 has been turned on for fuel dispensing) and to close the vacuum control valve 90 to isolate the outer annular space 56 from the STP 30 (step 106). Next, the tank monitor 62 monitors the vacuum level using vacuum level readings from the pressure sensor 60 via the sensing unit controller 84 (step 108). If the vacuum level decays to a catastrophic threshold vacuum level, which may be −10 inches of Hg in one embodiment of the present invention and also may be programmable in the tank monitor 62, this is an indication that a catastrophic leak may exist (decision 110). The sensing unit 82 opens the vacuum control valve 90 (step 112) and activates the STP 30 (unless the STP 30 is already turned on for fuel dispensing) to attempt to restore the vacuum level back to the defined initial threshold vacuum level (−15 inches of Hg in the specific example) (step 114).

Continuing onto FIG. 4B, the tank monitor 62 determines if the vacuum level in the outer annular space 56 has lowered back down to the defined initial threshold vacuum level (−15 inches of Hg in the specific example) within a defined period of time, which is programmable in the tank monitor 62 (decision 116). If not, this is an indication that a major leak exists in the outer wall 54 of the main fuel piping conduit 48 or the vacuum tubing 70, and the tank monitor 62 generates a catastrophic leak detection alarm (step 118). The tank monitor 62, if so programmed, will shut down the STP 30 so that the STP 30 does not pump fuel 22 to fuel dispensers that may leak due to the breach in the outer casing 25 (step 120), and the process ends (step 122). An operator or service personnel can then manually check the integrity of the outer annular space 56, vacuum tubing 70 and/or conduct additional leak detection tests on-site, as desired, before allowing the STP 30 to be operational again. If the vacuum level in the outer annular space 56 does lower back down to the defined initial threshold vacuum level within the defined period of time (decision 116), no leak detection alarm is generated at this point in the process.

Back in decision 110, if the vacuum level did not decay to the defined initial threshold vacuum level (−10 inches of Hg in specific example), this is also an indication that a catastrophic leak does not exist. Either way, if the answer to decision 110 is no or the answer to decision 116 is no, the tank monitor 62 goes on to perform a precision leak detection test since no catastrophic leak exists. The tank monitor 62 then continues to perform a precision leak detection test.

For the precision leak detection test, the tank monitor 62 directs the sensing unit controller 84 to close the vacuum control valve 90 if the process reached decision 116 (step 124). Next, regardless of whether the process came from decision 110 or decision 116, the tank monitor 62 determines if the vacuum level in the outer annular space 56 has decayed to a precision threshold vacuum level within a defined period of time, both of which may be programmable (decision 126). If not, the tank monitor 62 logs the precision leak detection test as completed with no alarm (step 136), and the leak detection process restarts again as programmed by the tank monitor 62 (step 100).

If the vacuum level in the outer annular space 56 has decayed to a precision threshold vacuum level within the defined period of time, the tank monitor 62 generates a precision leak detection alarm (step 128). The tank monitor 62 determines if it is has been programmed to shut down the STP 30 in the event of a precision leak detection alarm (decision 130). If yes, the tank monitor 62 shuts down the STP 30 (step 132), and the process ends (step 134). If not, the STP 30 can continue to operate when fuel dispensers are activated, and the leak detection process restarts again as programmed by the tank monitor 62 (step 100). This is because it may be acceptable to allow the STP 30 to continue to operate if a precision leak detection alarm occurs depending on regulations and procedures. Also, note that both the precision threshold vacuum level and the defined period of time may be programmable at the tank monitor 62 according to levels that are desired to be indicative of a precision leak.

Once a catastrophic leak or precision leak detection alarm is generated, service personnel are typically dispatched to determine if a leak really exists, and if so, to take corrective measures. The service personnel can close the isolation valve 88 between the sensing unit 82 and the outer annular space 56 to isolate the two from each other. The service personnel can then initiate leak tests manual from the tank monitor 62 that operate as illustrated in FIGS. 4A and 4B. If the leak detection tests pass after previously failing and after the isolation valve 88 is closed, this is indicative that some area of the outer annular space 56 contains the leak. If the leak detection tests continue to fail, this is indicative that the leak may be present in the vacuum tubing 70 connecting the sensing unit 82 to the outer annular space 56, or within the vacuum tubing 70 in the sensing unit 82 or the vacuum tubing 70 between sensing unit 82 and the STP 30. Closing of the isolation valve 88 also allows components of the sensing unit 82 and vacuum tubing 70 to be replaced without relieving the vacuum in the outer annular space 56 since it is not desired to recharge the system vacuum and possibly introduce vapors or liquid into the outer annular space 56 since the outer annular space 56 is under a vacuum and will draw in air or liquid if vented.

Figure 5:
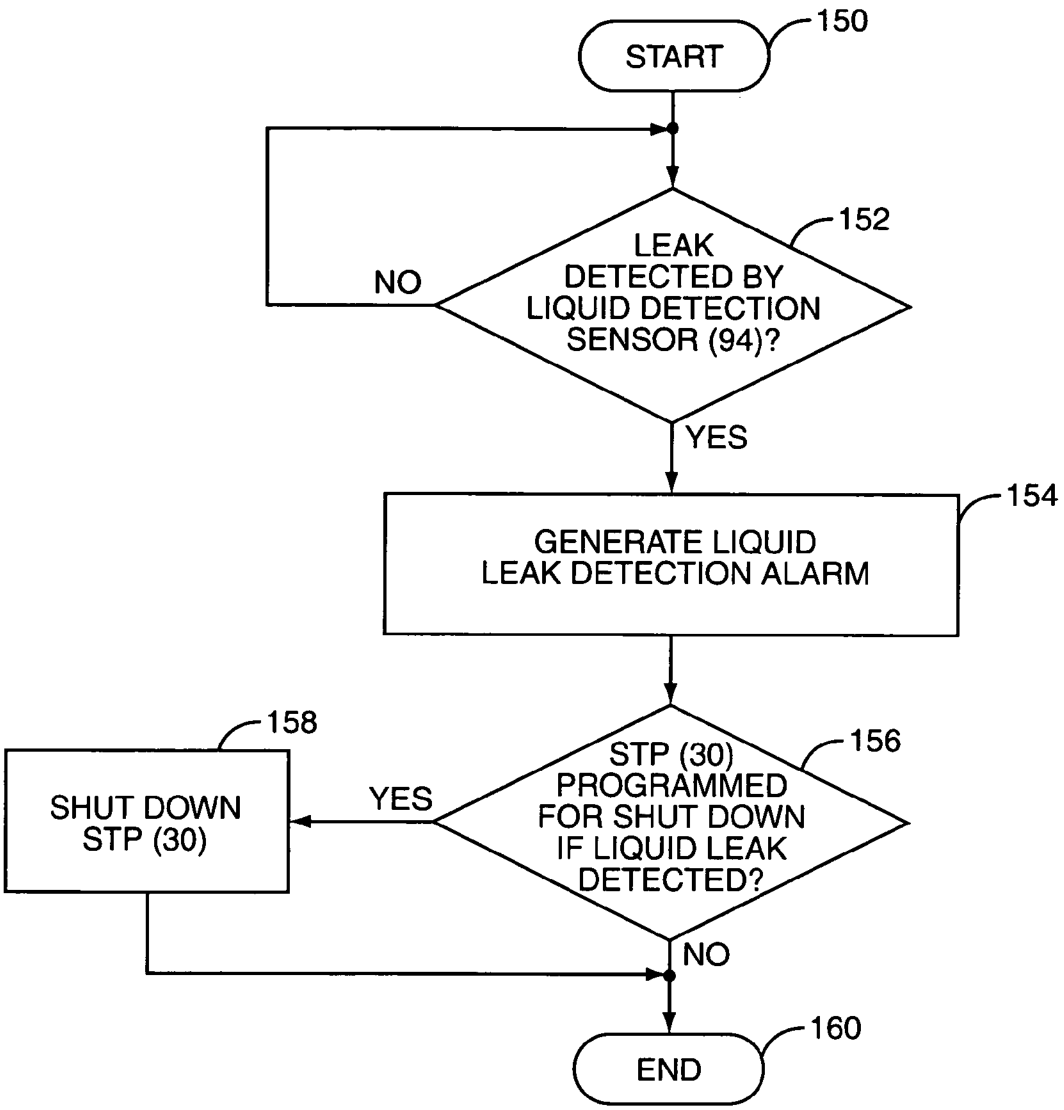
FIG. 5 is a flowchart diagram of a liquid leak detection test for one embodiment of the present invention.

FIG. 5 is a flowchart diagram of a liquid leak detection test performed by the tank monitor 62 to determine if a leak is present in the outer annular space 56. The liquid leak detection test may be performed by the tank monitor 62 on a continuous basis or periodic times, depending on the programming of the tank monitor 62. Service personnel may also cause the tank monitor 62 to conduct the liquid leak detection test manually.

The process starts (step 150), and the tank monitor 62 determines if a leak has been detected by the liquid detection sensor 94 (decision 152). If not, the tank monitor 62 continues to determine if a leak has been detected by the liquid detection sensor 94 in a continuous fashion. If the tank monitor 62 does determine from the liquid detection sensor 94 that a leak has been detected, the tank monitor 62 generates a liquid leak detection alarm (step 154). If the tank monitor 62 has been programmed to shut down the STP 30 in the event of a liquid leak detection alarm being generated (decision 156), the tank monitor 62 shuts down the STP 30 (if the STP 30 is on for fuel dispensing) (step 158), and the process ends (step 160). If the tank monitor 62 has not been programmed to shut down the STP 30 in the event of a liquid leak detection alarm being generated, the process just ends without taking any action with respect to the STP 30 (step 160).

Figure 6:
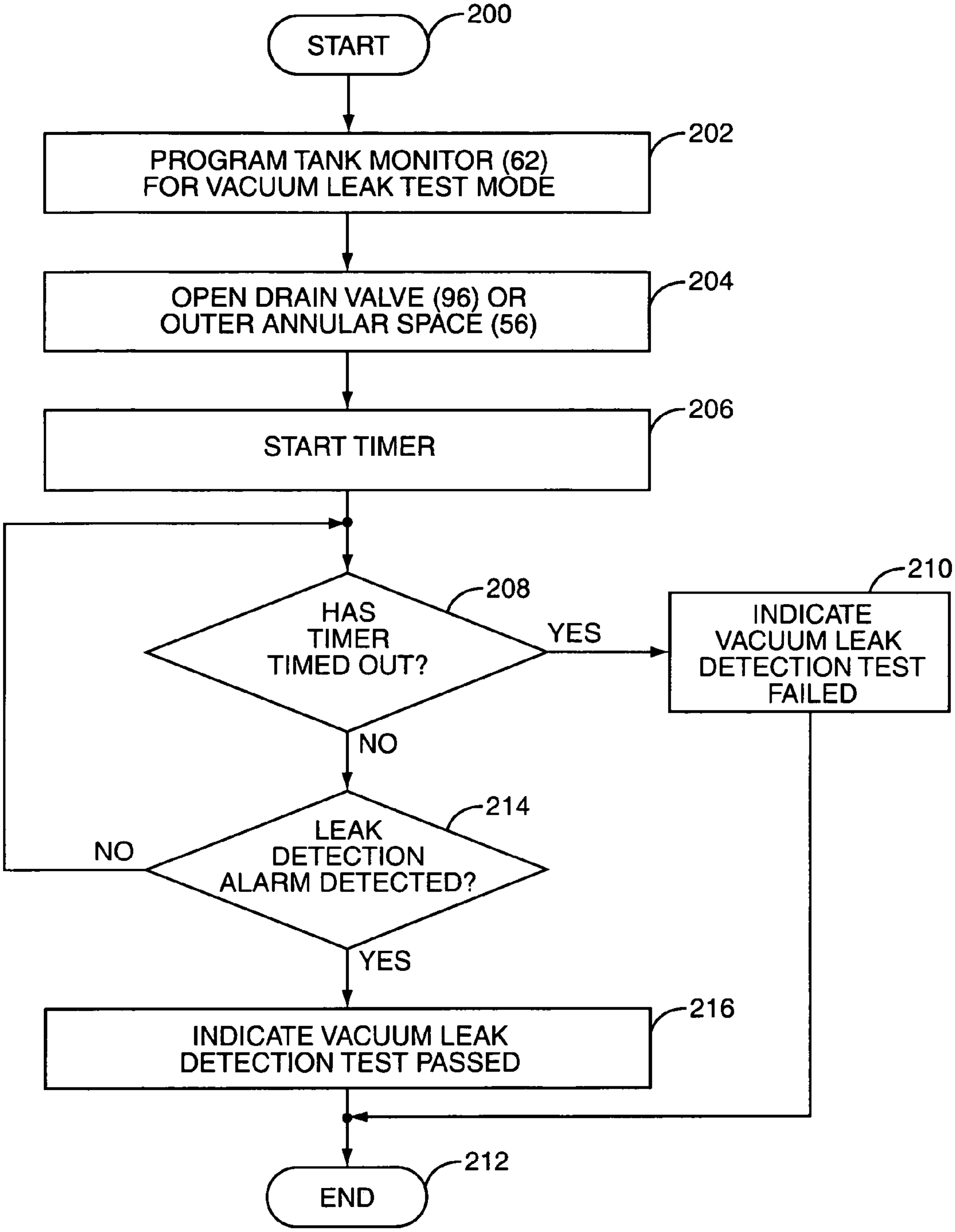
FIG. 6 is a flowchart diagram of a functional vacuum leak detection test for one embodiment of the present invention that is carried out in a tank monitor test mode.

FIG. 6 is a flowchart diagram that discloses a functional vacuum leak detection test performed to determine if the sensing unit 82 can properly detect a purposeful leak. If a leak is introduced into the outer annular space 56, and a leak is not detected by the sensing unit 82 and/or tank monitor 62, this is an indication that some component of the leak detection system is not working properly.

The process starts (step 200), and a service person programs the tank monitor 62 to be placed in a functional vacuum leak detection test mode (step 202). Next, a service person manually opens the drain valve 96 or other valve to provide an opening in the outer annular space 56 or vacuum tubing 70 so that a leak is present in the outer annular space 56 (step 204). The tank monitor 62 starts a timer (step 206) and determines when the timer has timed out (decision 208). If the timer has not timed out, the tank monitor 62 determines if a leak detection alarm has been generated (decision 214). If not, the process continues until the timer times out (decision 208). If a leak detection alarm has been generated, as is expected, the tank monitor 62 indicates that the functional vacuum leak detection test passed and that the leak detection system is working properly (step 216) and the process ends (step 212).

If the timer has timed out without a leak being detected, this is indicative that the functional vacuum leak detection test failed (step 210) and that there is a problem with the system, which could be a component of the sensing unit 82 and/or tank monitor 62. Note that although this functional vacuum leak detection test requires manual intervention to open the drain valve 96 or other valve to place a leak in the outer annular space 56 or vacuum tubing 70, this test could be automated if the drain valve 96 or other valve in the outer annular space 56 or vacuum tubing 70 was able to be opened and closed under control of the sensing unit 82 and/or tank monitor 62.

Figure 7:
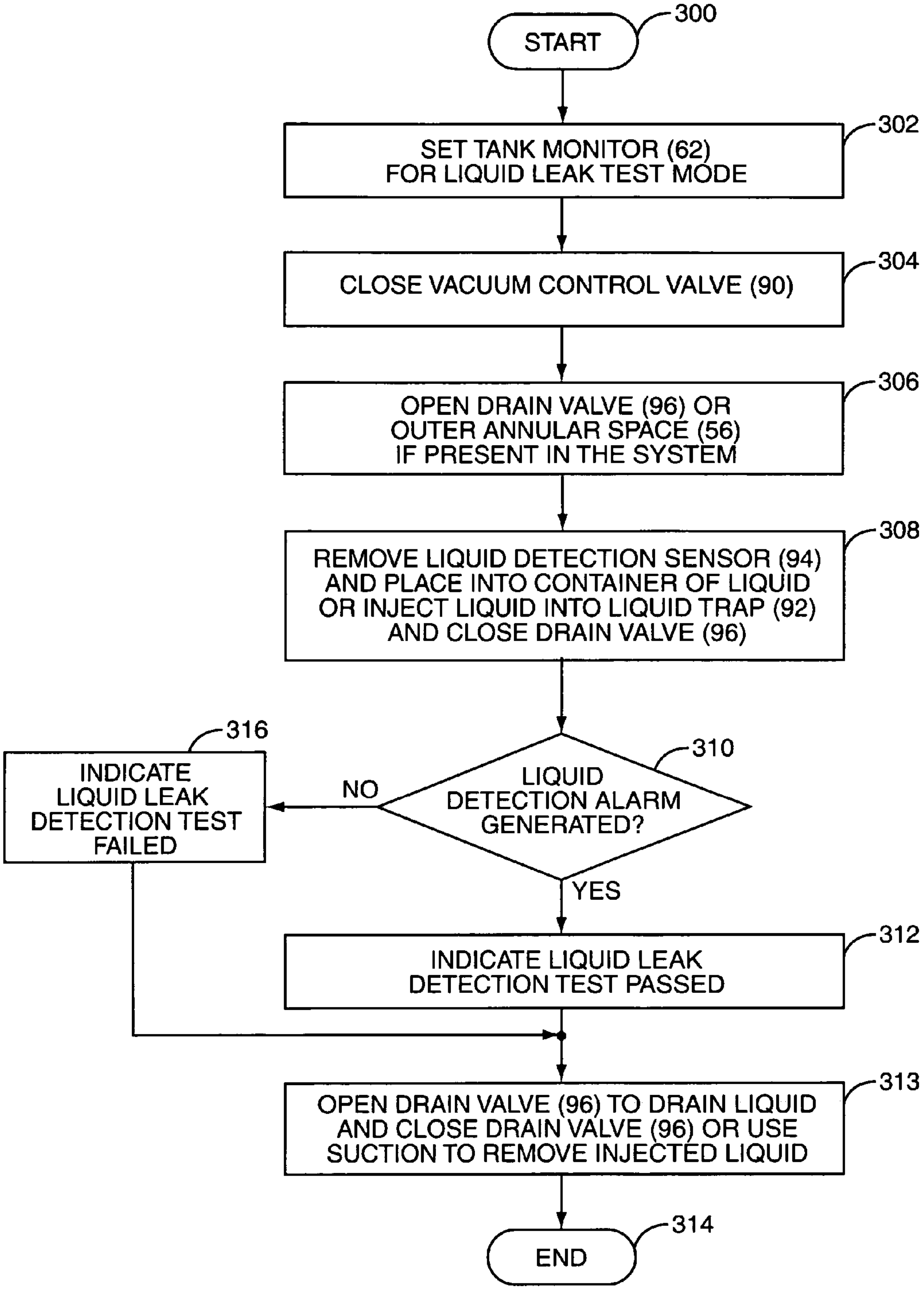
FIG. 7 is a flowchart diagram of a functional liquid leak detection test for one embodiment of the present invention that is carried out in a tank monitor test mode.

FIG. 7 illustrates a functional liquid leak detection test that can be used to determine if the liquid detection system of the present invention is operating properly. The liquid detection sensor 94 is removed from the liquid trap conduit 92 and submerged into a container of liquid (not shown). Or in an alternative embodiment, a purposeful liquid leak is injected into the liquid trap conduit 92 to determine if a liquid leak detection alarm is generated. If a liquid leak detection alarm is not generated when liquid is placed on the liquid detection sensor 94, this indicates that there has been a failure or malfunction with the liquid detection system, including possibly the liquid detection sensor 94, the sensing unit 82, and/or the tank monitor 62.

The process starts (300), and the tank monitor 62 is set to a mode for performing the functional liquid leak detection test (step 302). The vacuum control valve 90 may be closed to isolate the liquid trap conduit 92 from the STP 30 so that the vacuum level in the conduit piping 56 and sensing unit 82 is not released when the drain valve 96 is opened (step 304). Note that this is an optional step. Next, the drain valve 96, if present, or outer annular space 56 is opened in the system (step 306). The liquid detection sensor 94 is either removed and placed into a container of liquid, or liquid is inserted into liquid trap conduit 92, and the drain valve 96 is closed (step 308). If the tank monitor 62 detects a liquid leak from the sensing unit 82 (decision 310), the tank monitor 62 registers that the functional liquid leak detection test has passed (step 312). If no liquid leak is detected (decision 310), the tank monitor 62 registers that the functional liquid leak detection test failed (step 316). After the test is conducted, if liquid was injected into the liquid trap conduit 92 as the method of subjecting the liquid detection sensor 94 to a leak, either the drain valve 96 is opened to allow the inserted liquid to drain and then closed afterwards for normal operation or a suction device is placed into the liquid trap conduit 92 by service personnel to remove the liquid (step 313), and the process ends (step 314).

Note that although this functional liquid leak detection test requires manual intervention to open and close the drain valve 96 and to inject a liquid into the liquid trap conduit 92, this test may be automated if a drain valve 96 is provided that is capable of being opened and closed under control of the sensing unit 82 and/or tank monitor 62 and a liquid could be injected into the liquid trap conduit 92 in an automated fashion.

Figure 8:
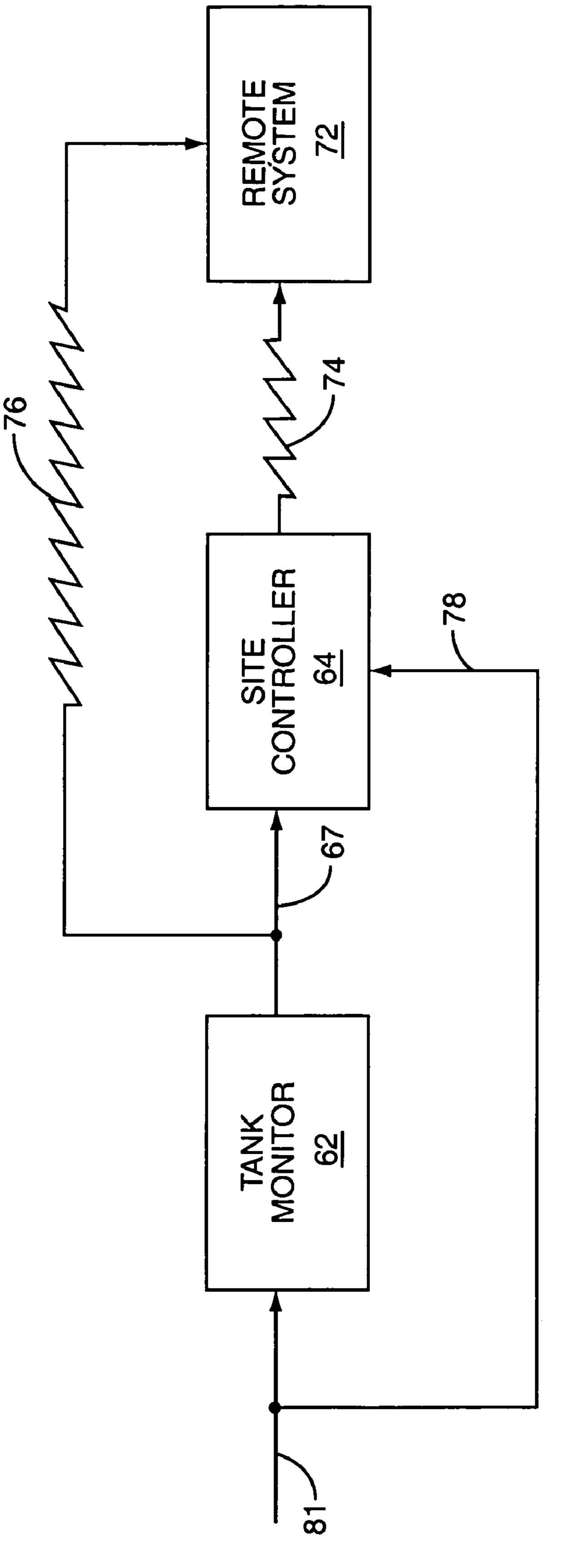
FIG. 8 is a schematic diagram of a tank monitor communication architecture.

FIG. 8 illustrates a communication system whereby leak detection alarms and other information obtained by the tank monitor 62 and/or site controller 64 from the communication line 81 may be communicated to other systems if desired. This information, such as leak detection alarms for example, may be desired to be communicated to other systems as part of a reporting and dispatching process to alert service personnel or other systems as to a possible breach or leak in the outer wall 54 of the main fuel piping conduit 48.

The tank monitor 62 that is communicatively coupled to the sensing unit 82 and other components of the present invention via the communication line 81 may be communicatively coupled to the site controller 64 via a communication line 67. The communication line 67 may be any type of electronic communication connection, including a direct wire connection, or a network connection, such as a local area network (LAN) or other bus communication. The tank monitor 62 may communicate leak detection alarms, vacuum level/pressure level information and other information from the sensing unit 82 to the site controller 64. The site controller 64 may be further communicatively coupled to a remote system 72 to communicate this same information to the remote system 72 from the tank monitor 62 and the site controller 64 via a remote communication line 74. The remote communication line 74 may be any type of electronic communication connection, such as a PSTN, or network connection such as the Internet, for. example. The tank monitor 62 may also be directly connected to the remote system 72 using a remote communication line 76 rather than communication through the site controller 64. The site controller 64 may also be connected to the communication line 81 via communication line 78 so that the aforementioned information is obtained directly by the site controller 64 rather than through the tank monitor 62.

Note that any type of controller, control system, sensing unit controller 84, site controller 64 and remote system 72 may be used interchangeably with the tank monitor 62 as described in this application and the claims of this application.

Those skilled in the art will recognize improvements and modifications to the preferred embodiments of the present invention. All such improvements and modifications are considered within the scope of the concepts disclosed herein and the claims that follow. Note that the sensing unit 82 may be contained inside the STP housing 36 or outside the STP housing 36, and may be contained inside or outside of the STP sump 32. The leak detection tests may be carried out by the STP 30 applying a vacuum level to the outer annular space 56 that can be either negative or positive for vacuum level changes indicative of a leak.

What is claimed is:

1. A system for detecting a leak in a double-walled fuel piping having an outer annular space that carries fuel from an underground storage tank in a service station environment, comprising:

a pressure sensor that is coupled to the outer annular space to detect a vacuum level in the outer annular space;

a sensing unit controller that is coupled to said pressure sensor to determine the vacuum level in the outer annular space;

a submersible turbine pump that is fluidly coupled to the fuel in the underground storage tank to draw the fuel out of the underground storage tank wherein said submersible turbine pump is also coupled to the outer annular space;

said submersible turbine pump creates a vacuum level in the outer annular space wherein said sensing unit controller determines the vacuum level in the outer annular space using said pressure sensor;

a controller that is electrically coupled to said submersible turbine pump wherein said submersible turbine pump creates a defined initial threshold vacuum level in the outer annular space after receiving a test initiation signal from the controller, wherein the controller is electrically coupled to said sensing unit controller to receive the vacuum level in the outer annular space; and a float liquid detection sensor that is coupled to the outer annular space, wherein said float liquid detection sensor is coupled to said sensing unit controller and wherein said float liquid detection sensor detects if liquid is present in the outer annular space.

2. The system of claim 1, wherein said sensing unit controller communicates a liquid detection by said liquid detection sensor to the controller.

3. The system of claim 2, wherein the controller generates a leak detection alarm when said liquid detection is communicated from said sensing unit controller.

4. The system of claim 3, wherein the controller communicates said leak detection alarm to a system comprised from the group consisting of a site controller and a remote system.

5. The system of claim 2, wherein the controller disables said submersible turbine pump when said liquid detection is communicated from said sensing unit controller.

6. The system of claim 1, further comprising vacuum tubing that fluidly couples the submersible turbine pump to the outer annular space to create a vacuum level in the outer annular space.

7. A method for detecting a leak in a double-walled fuel piping having an outer annular space that carries fuel from an underground storage tank in a service station environment, comprising the steps of:

creating a defined initial threshold vacuum level in the outer annular space using a submersible turbine pump that is also fluidly coupled to the fuel in the underground storage tank to draw the fuel out of the underground storage tank;

sensing a vacuum level in the outer annular space using a pressure sensor;

communicating the vacuum level in the outer annular space to a controller;

monitoring the vacuum level in the outer annular space to determine if a leak exists in the fuel piping; and sensing whether liquid is present in the outer annular space using a float liquid detection sensor.

8. The method of claim 7, further comprising generating a liquid leak detection alarm if said liquid detection sensor senses liquid in the outer annular space.

9. The method of claim 7, further comprising disabling said submersible turbine pump if said liquid detection sensor senses liquid in the outer annular space.

10. The method of claim 7, wherein the submersible turbine pump is fluidly coupled to the outer annular space using vacuum tubing.

11. A system for detecting a leak in a double-walled fuel piping having an outer annular space that carries fuel from an underground storage tank in a service station environment, comprising:

a pressure sensor that is coupled to the outer annular space to detect a vacuum level in the outer annular space;

a sensing unit controller that is coupled to said pressure sensor to determine the vacuum level in the outer annular space;

a submersible turbine pump that is fluidly coupled to the fuel in the underground storage tank to draw the fuel out of the underground storage tank wherein said submersible turbine pump is also coupled to the outer annular space;

said submersible turbine pump creates a vacuum level in the outer annular space wherein said sensing unit controller determines the vacuum level in the outer annular space using said pressure sensor;

a controller that is electrically coupled to said submersible turbine pump wherein said submersible turbine pump creates a defined initial threshold vacuum level in the outer annular space after receiving a test initiation signal from the controller, wherein the controller is electrically coupled to said sensing unit controller to receive the vacuum level in the outer annular space; and a float liquid detection sensor that is coupled to the outer annular space, wherein said float liquid detection sensor is coupled to said sensing unit controller and wherein said float liquid detection sensor detects if liquid is present in the outer annular space;

wherein the controller communicates a leak detection alarm to a system comprised from the group consisting of a site controller and a remote system.

12. The system of claim 11, wherein said sensing unit controller communicates a liquid detection by said float liquid detection sensor to the controller.

13. The system of claim 12, wherein the controller disables said submersible turbine pump when said liquid detection is communicated from said sensing unit controller.

14. The system of claim 11, wherein the controller is a system comprised from the group consisting of a tank monitor, a site controller, and a remote system.

15. The system of claim 11, further comprising a vacuum tubing that fluidly couples the submersible turbine pump to the outer annular space to create a vacuum level in the outer annular space.

16. A system for detecting a leak in a double-walled fuel piping having an outer annular space that carries fuel from an underground storage tank in a service station environment, comprising:

a pressure sensor that is coupled to the outer annular space to detect a vacuum level in the outer annular space;

a sensing unit controller that is coupled to said pressure sensor to determine the vacuum level in the outer annular space;

a submersible turbine pump that is fluidly coupled to the fuel in the underground storage tank to draw the fuel out of the underground storage tank wherein said submersible turbine pump is also coupled to the outer annular space;

said submersible turbine pump creates a vacuum level in the outer annular space wherein said sensing unit controller determines the vacuum level in the outer annular space using said pressure sensor;

a controller that is electrically coupled to said submersible turbine pump wherein said submersible turbine pump creates a defined initial threshold vacuum level in the outer annular space after receiving a test initiation signal from the controller, wherein the controller is electrically coupled to said sensing unit controller to receive the vacuum level in the outer annular space; and a float liquid detection sensor that is coupled to the outer annular space, wherein said float liquid detection sensor is coupled to said sensing unit controller and wherein said float liquid detection sensor detects if liquid is present in the outer annular space;

wherein the controller is a system comprised from the group consisting of a tank monitor, a site controller, and a remote system.

17. The system of claim 16, wherein said sensing unit controller communicates a liquid detection by said float liquid detection sensor to the controller.

18. The system of claim 16, wherein the controller generates a leak detection alarm when said liquid detection is communicated from said sensing unit controller.

19. The system of claim 16, wherein the controller disables said submersible turbine pump when said liquid detection is communicated from said sensing unit controller.

20. The system of claim 16, further comprising a vacuum tubing that fluidly couples the submersible turbine pump to the outer annular space to create a vacuum level in the outer annular space.

21. A method for detecting a leak in a double-walled fuel piping having an outer annular space that carries fuel from an underground storage tank in a service station environment, comprising the steps of:

creating a defined initial threshold vacuum level in the outer annular space using a submersible turbine pump that is also fluidly coupled to the fuel in the underground storage tank to draw the fuel out of the underground storage tank;

sensing a vacuum level in the outer annular space using a pressure sensor;

communicating the vacuum level in the outer annular space to a controller;

monitoring the vacuum level in the outer annular space to determine if a leak exists in the fuel piping;

sensing whether liquid is present in the outer annular space using a float liquid detection sensor;

generating a liquid leak detection alarm if said liquid detection sensor senses liquid in the outer annular space; and communicating said liquid leak detection alarm to a system comprised from the group consisting of a tank monitor, a site controller, and a remote system.

22. The method of claim 21, further comprising disabling said submersible turbine pump if said liquid detection sensor senses liquid in the outer annular space.

23. The method of claim 21, wherein the controller is a system comprised from the group consisting of a tank monitor, a site controller, and a remote system.

24. The method of claim 21, wherein the submersible turbine pump is fluidly coupled to the outer annular space using a vacuum tubing.

25. A method for detecting a leak in a double-walled fuel piping having an outer annular space that carries fuel from an underground storage tank in a service station environment, comprising the steps of:

creating a defined initial threshold vacuum level in the outer annular space using a submersible turbine pump that is also fluidly coupled to the fuel in the underground storage tank to draw the fuel out of the underground storage tank;

sensing a vacuum level in the outer annular space using a pressure sensor;

communicating the vacuum level in the outer annular space to a controller;

monitoring the vacuum level in the outer annular space to determine if a leak exists in the fuel piping; and sensing whether liquid is present in the outer annular space using a float liquid detection sensor;

wherein the controller is a system comprised from the group consisting of a tank monitor, a site controller, and a remote system.

26. The method of claim 25, further comprising disabling said submersible turbine pump if said liquid detection sensor senses liquid in the outer annular space.

27. The method of claim 25, wherein the submersible turbine pump is fluidly coupled to the outer annular space using a vacuum tubing.

* * * * *